US012118964B2

(12) United States Patent
Ye

(10) Patent No.: US 12,118,964 B2
(45) Date of Patent: Oct. 15, 2024

(54) DISPLAY CONTROLLER AND METHOD HAVING AUTOMATIC DATA UNDERRUN RECOVERY FUNCTION

(71) Applicant: NANJING SEMIDRIVE TECHNOLOGY CO., LTD., Suzhou (CN)

(72) Inventor: Qiaoyu Ye, Shanghai (CN)

(73) Assignee: NANJING SEMIDRIVE TECHNOLOGY CO., LTD., Nanjing (CN)

( * ) Notice: Subject to any disclaimer, the term of this patent is extended or adjusted under 35 U.S.C. 154(b) by 0 days.

(21) Appl. No.: 17/768,494

(22) PCT Filed: Sep. 17, 2020

(86) PCT No.: PCT/CN2020/115766

§ 371 (c)(1),
(2) Date: Apr. 13, 2022

(87) PCT Pub. No.: WO2021/189781

PCT Pub. Date: Sep. 30, 2021

(65) Prior Publication Data

US 2024/0105101 A1 Mar. 28, 2024

(30) Foreign Application Priority Data

Mar. 27, 2020 (CN) ......................... 202010227597.9

(51) Int. Cl.
*G09G 5/39* (2006.01)
*G09G 3/20* (2006.01)

(52) U.S. Cl.
CPC ............ *G09G 5/39* (2013.01); *G09G 3/2096* (2013.01); *G09G 2310/08* (2013.01);
(Continued)

(58) Field of Classification Search
CPC .. G09G 5/39; G09G 2310/08; G09G 2350/00; G09G 3/36; G09G 2340/00; G06F 13/28
See application file for complete search history.

(56) References Cited

U.S. PATENT DOCUMENTS

| | | | | |
|---|---|---|---|---|
| 2016/0292814 | A1 | 10/2016 | Holland et al. | |
| 2017/0039932 | A1 | 2/2017 | Staudenmaier et al. | |
| 2017/0301319 | A1 * | 10/2017 | Croxford | G09G 5/391 |

FOREIGN PATENT DOCUMENTS

| | | |
|---|---|---|
| CN | 101160614 | 4/2008 |
| CN | 102419964 | 4/2012 |

(Continued)

OTHER PUBLICATIONS

Kim et al., Machine Translation of Foreign Patent Document CN 102419964 A, Under-run compensation circuit, method thereof, and apparatuses having the same, Apr. 18, 2012, pp. 1-17 (Year: 2012).*

*Primary Examiner* — Amr A Awad
*Assistant Examiner* — Maheen I Javed
(74) *Attorney, Agent, or Firm* — SOROKER AGMON NORDMAN PTE LTD

(57) ABSTRACT

A display controller having an automatic data underrun recovery function, comprising: a direct memory access (DMA) controller coupled to an image data processor; the image data processor coupled to an image layer synthesizer; the image layer synthesizer coupled to a first-in first-out (FIFO) memory; a display timing generation circuit (DTC) coupled to the FIFO memory, the display timing generation circuit (DTC) being coupled to an external display device; and an underrun state machine separately coupled to the display timing generation circuit (DTC), an underload data counter, the DMA controller, the image data processor, the image layer synthesizer, and the FIFO memory. The provided display controller has an automatic data underrun recovery function.

6 Claims, 6 Drawing Sheets

(52) U.S. Cl.
CPC . *G09G 2320/0247* (2013.01); *G09G 2350/00* (2013.01); *G09G 2360/18* (2013.01); *G09G 2370/08* (2013.01); *G09G 2380/10* (2013.01)

(56) References Cited

FOREIGN PATENT DOCUMENTS

| | | | | | |
|---|---|---|---|---|---|
| CN | 102419964 A | * | 4/2012 | ............. | G09G 5/363 |
| CN | 111128089 | | 5/2020 | | |
| WO | WO2008132556 | | 11/2008 | | |

* cited by examiner

DISPLAY CONTROLLER AND METHOD HAVING AUTOMATIC DATA UNDERRUN RECOVERY FUNCTION

TECHNICAL FIELD

The present invention relates to the technical field of vehicle-mounted display controllers, in particular to a display controller with data under run self-recovery function.

BACKGROUND ART

At present, display controllers have been widely applied in various fields. For example, they are applied in vehicle-mounted LCD instruments, entertainment and navigation display systems and industrial control human-machine interfaces (HMIs), etc.

As application systems become more and more complex, the demand for the bandwidth of system memory is increased greatly. The greatly increased demand often results in that the display controller fails to get the display data from the system memory in time, and causes a problem of data under run in timing-controlled line buffer area (FIFO), and further cause long time of flickering or tearing on the display screen that can't be recovered.

Therefore, system renovation of the existing vehicle-mounted display controllers is necessary, to effectively solve the above-mentioned problem of data under run.

CONTENTS OF THE INVENTION

FIFO data under run being displayed during reading of an existing timing controller TCON is a common problem in display systems. The object of the present invention is to provide a display controller with data under run self-recovery function, so as to effectively solve the above-mentioned data under run problem.

The present invention provides a display controller with data under run self-recovery function, which comprises an image processor and a timing controller TCON, wherein the image processor further comprises a direct memory access DMA controller, an image data processor, an image layer combiner, and a first-in-first-out FIFO memory; the timing controller further comprises a display timing circuit DTC, an under run state machine, and au under run data counter; wherein the direct memory access DMA controller is coupled to the image data processor, the data processor is coupled to the image layer combiner, the image layer combiner is coupled to the FIFO memory, the display timing circuit DTC is coupled to the FIFO memory, the display timing circuit DTC is coupled to an external display device, and the under run state machine is coupled to the display timing circuit DTC, the under run data counter, the direct memory access DMA controller, the image data processor, the image layer combiner and the FIFO memory respectively.

Furthermore, the display timing circuit DTC is configured to execute the following steps: accessing the FIFO memory to acquire the image data stored in the FIFO memory; according to the timing requirements of the external display device, generating four types of control signals required by the display device, i.e., frame synchronization signal VSYNC, line synchronization signal HSYNC, data enable signal DE and display clock signal PCLK; when the data enable signal DE is valid, continuously acquiring the image display data from the FIFO memory, and then, sending the display data PDATA to the display device for display at the rising edge of each PCLK.

Furthermore, the under run state machine is configured to execute the following steps: receiving the frame synchronization signal VSYNC and the line synchronization signal HSYNC sent by the display timing circuit DTC and an FIFO empty signal FIFO_EMPTY returned by the FIFO memory; judging the FIFO empty signal FIFO_EMPTY returned by the FIFO memory when the data enable signal DE is valid; if the FIFO_EMPTY signal is valid, it indicates that the timing controller TCON has encountered a data under run problem when reading the FIFO memory; then the under run state machine jumping to a first under run state.

Furthermore, when the under run state machine is in the first under run state, the under run state machine is configured to execute the following steps: sending a count increment instruction to the under run data counter if the FIFO_EMPTY signal is valid and the FIFO read request signal is valid; according to the value of under run data logged by the under run data counter, when the data enable signal DE is invalid in the line blanking or frame blanking region, sending a FIFO read request instruction to the FIFO memory to read data, the number of which is equal to the value of data logged by the under run data counter; the under run state machine sending a count decrement instruction to the under run data counter whenever a data item is read; the under run state machine exiting the first under run state and jumping to the normal state once the under run data counter counts to zero.

Furthermore, the under run state machine is configured to execute the following steps: when the frame synchronization signal VSYNC is valid, determining that the count value of the under run data counter is not zero; then the under run state machine jumping from the first under run state to a second under run state.

Furthermore, when the under run state machine is in the second under run state, the under run state machine is configured to execute the following steps: using a software-programmable register as a switch, and generating a clear signal TCON_FLUSH when the register is switched on; clearing the residual data in the entire pipeline by means of the TCON_FLUSH signal; when the register is switched oft the under run state machine exiting the second under run state and jumping to the first under run state, and continuing the execution of all processes in the first under run state.

The present invention further provides a display control method with data under run self-recovery function, which comprises the following steps: a display timing circuit DTC accessing a FIFO memory, to acquire the image data stored in the FIFO memory; the display timing circuit DTC receiving a display trigger signal from an external display device and generating four types of control signals according to the image data stored in the FIFO memory, i.e., frame synchronization signal VSYNC, data enable signal DE, line synchronization signal HSYNC and display clock signal PCLK; the display timing circuit DTC converting the image data into display data PDATA, according to the frame synchronization signal VSYNC and the line synchronization signal HSYNC; when the data enable signal DE is valid, the display timing circuit DTC sending the display data PDATA to the external display device for image display according to the display clock signal PCLK; receiving the frame synchronization signal VSYNC and the line synchronization signal HSYNC sent by the display timing circuit DTC and a FIFO empty signal FIFO_EMPTY returned by the FIFO memory; when the data enable signal DE is valid, judging the FIFO empty signal FIFO_EMPTY returned by the FIFO memory, if the FIFO_EMPTY signal is valid, it indicates that the timing controller TCON has encountered a data under run problem when reading the FIFO memory; the display timing circuit DTC judging that a data under run problem in the first state or the second state has occurred, through comparison between the data under run time length and a preset time length value; the display timing circuit DTC carrying out corresponding data under run processing, according to the judgment result.

Furthermore, the under run state machine executes the following steps when it is in the first under run state: sending a count increment instruction to the under run data counter if the FIFO_EMPTY signal is valid and the FIFO read request signal is valid; according to the value of the under run data logged by the under run data counter, when the data enable signal DE is invalid in the line blanking or frame blanking region, sending a FIFO read request instruction to the FIFO memory to read data, the number of which is equal to the value of the data logged by the under run data counter; the under run state machine sending a count decrement instruction to the under run data counter whenever a data item is read; the under run state machine exiting the first under run state and jumping to the normal state once the under run data counter counts to zero.

Furthermore, in the display control method, the following steps are performed: when the frame synchronization signal VSYNC is valid, determining that the count value of the under run data counter is not zero; then the under run state machine jumping from the first under run state to a second under run state.

Furthermore, in the display control method, when the under run state machine is in the second under run state, the following steps are performed: using a software-programmable register as a switch, and generating a clear signal TCON_FLUSH when the register is switched on; clearing the residual data in the entire pipeline by means of the clearing signal TCON_FLUSH; when the register is switched off, the under run state machine exiting the second under run state and jumping to the first under run state, and continuing the execution of all processes in the first under run state.

The display controller and the method thereof provided by the present invention have a display device data under run self-recovery function. Mainly by means of two different methods, the solution of the present invention ensures that the timing controller TCON can read correct display data from the FIFO at the start of display of the next frame, thereby effectively solves a problem of instantaneous data under run that leads to long-time of flickering or tearing on the display screen, which is incurred by greater peak bandwidth consumption of the display system.

Additional aspects and advantages of the present invention will be partially shown in the following description, and will become apparent from the following description, or can be understood in the practice of the present invention.

EMBODIMENTS

Hereunder embodiments of the present invention will be described in detail. The examples of the embodiments are illustrated in the accompanying drawings, wherein, identical or similar reference numbers indicate identical or similar elements or elements with identical or similar functions throughout the description. The embodiments described with reference to the accompanying drawings are exemplary and only used to explain the present invention, and shall not be comprehended as constituting any limitation to the present invention.

Those skilled in the art can understand that the relevant modules mentioned in the present invention are hardware devices for executing one or more of the steps, measures and schemes in the operations, methods and processes described in the present application. The hardware devices may be specially designed and manufactured for the desired purpose, or they may be brown devices in a general-purpose computer or other known hardware devices. The general-purpose computer may be selectively activated or reconfigured by programs stored therein.

Those skilled in the art can understand that the singular forms "a", "an", "said" and "the" used herein may also include plural forms, unless otherwise expressly stated. It should be further understood that the expression "comprise" used in the specification of the present invention means the presence of the features, integers, steps, operations, elements and/or components, but does not exclude the presence or addition of one or more other features, integers, steps, operations, elements, components and/or groups of them. It should be understood that the expression of an element being "connected" or "coupled" to another element means that the element may be directly connected or coupled to other element or an intermediate element may exist between the two elements. Besides, the word "connection" or "coupling" used herein may include wireless connection or coupling. As used herein, the phrase "and/or" includes any unit and all combinations of one or more associated items listed herein.

Those skilled in the art can understand that all terms used herein (including technical terms and scientific terms) have the common meanings that are comprehended by those having ordinary skills in the art to which the present invention belongs, unless otherwise defined. It should also be understood that those terms defined in general dictionaries should be understood as having meanings in line with their meanings in the context of the prior art, and should not be comprehended as having ideal or too formal meaning, unless otherwise defined herein.

Figure 1:
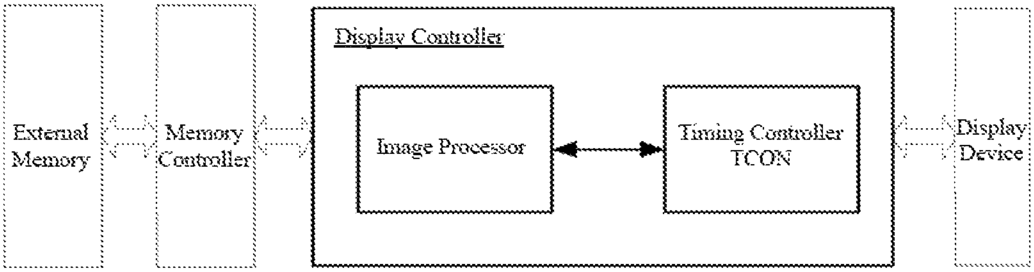
FIG. 1 shows a diagram of the system architecture of the display controller according to an embodiment of the present invention.

FIG. 1 shows a diagram of the system architecture of the display controller according to an embodiment of the present invention. As shown in FIG. 1, the system comprises: an external memory, a memory controller, a display controller and an external display device. In order to highlight the core innovation of the present invention, the internal structure of a display controller with data under run self-recovery function proposed by the present invention and the interactions between the display controller and the external memory, the memory controller and the external display device will be emphatically described below. The display system is configured to process the display data stored in the external memory into output image data, and then provide the output image data to a display device for image presentation. The external image data is provided by the image controller, and has a fixed resolution. Therefore, scaling adjustment must be made to the external image data to turn it into image data with appropriate resolution, so that the display device can display the output image data correctly. Therefore, in the present invention, the "display controller" is defined as a device for processing external image data into desired output image data.

Figure 2:
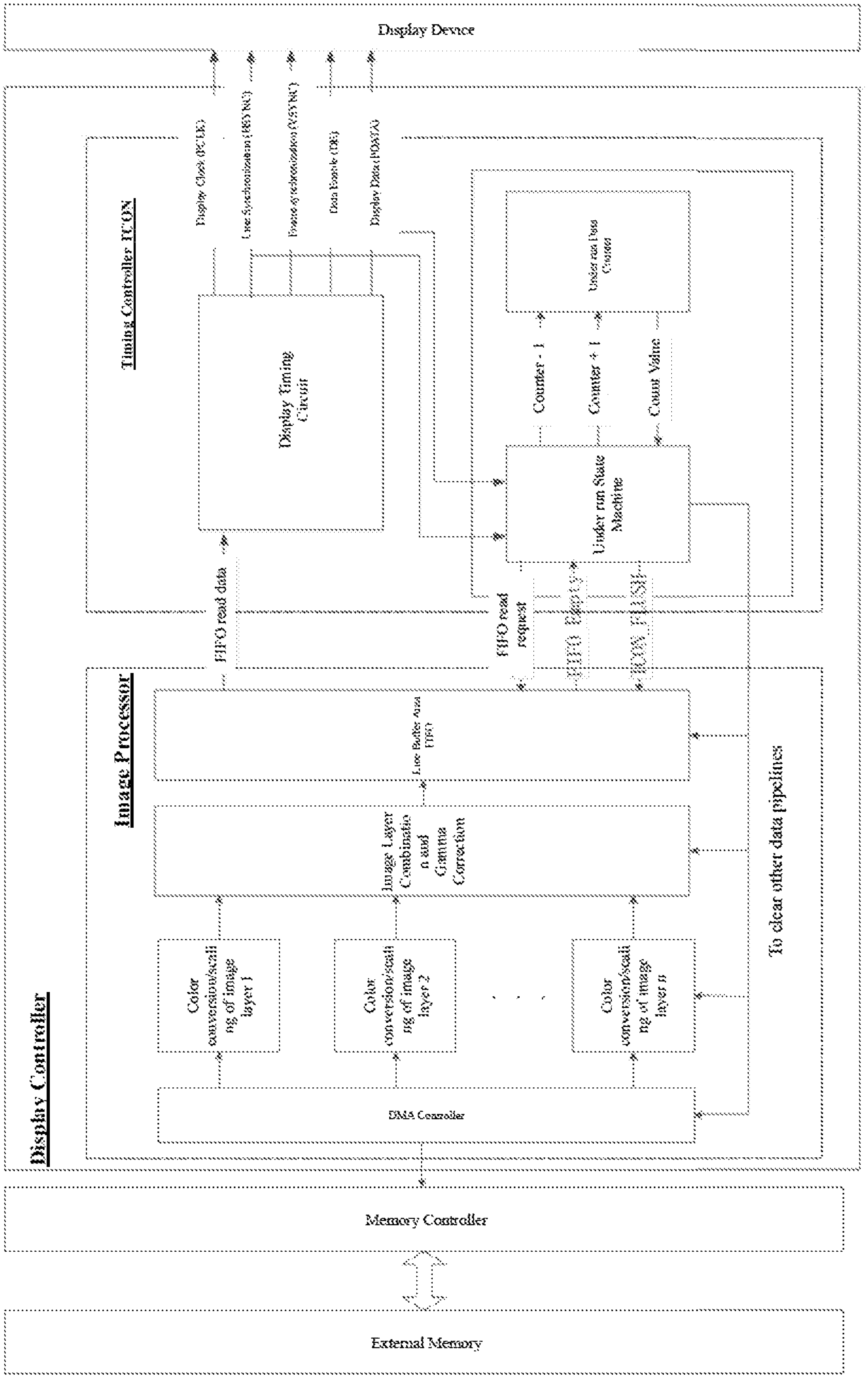
FIG. 2 shows a structural diagram of the functional modules of the display controller according to an embodiment of the present invention.

FIG. 2 shows a structural diagram of the functional modules of the display controller according to an embodiment of the present invention. The display controller in the present invention employs the follow architecture: it reads the display data from the system memory through a bus, processes the display data through color space conversion, image scaling and image layer combination, etc., then writes the data into a FIFO line buffer area, and finally generates a timing sequence required by the display device by means of a timing controller TCON to chive the display device.

As shown in FIG. 1, the present invention provides a display controller with data under run self-recovery function, which comprises an image processor and a timing controller TCON. As shown in FIG. 2, the image processor further comprises a direct memory access DMA controller, an image data processor, an image layer combiner, and a FIFO memory. The timing controller further comprises a display timing circuit DTC, an under run state machine, and an under run data counter; wherein the direct memory access DMA controller is coupled to the image data processor, the data processor is coupled to the image layer combiner, the image layer combiner is coupled to the FIFO memory, the DTC is coupled to the FIFO memory, the display timing circuit DTC is coupled to an external display device, and the under run state machine is coupled to the display timing circuit DTC, the under run data counter, the direct memory access DMA controller, the image data processor, the image layer combiner and the FIFO memory respectively.

Figure 3:
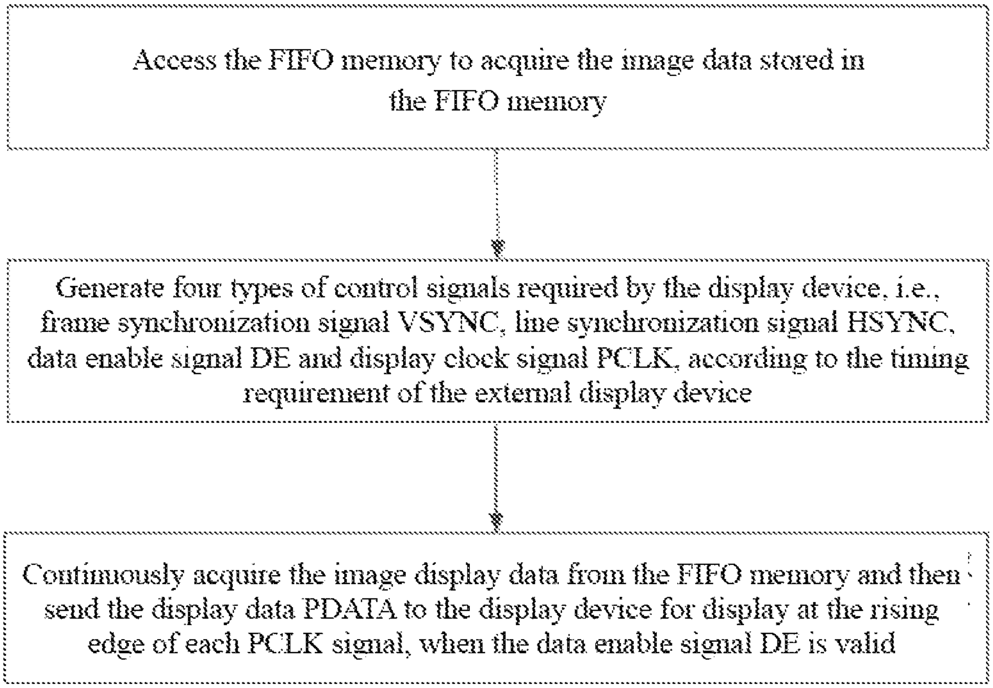
FIG. 3 shows a logic flow chart of the display timing circuit according to an embodiment of the present invention.

In an example, as shown in FIG. 3, the display timing circuit DTC is configured to execute the following steps: accessing the FIFO memory to acquire the image data stored in the FIFO memory; according to the timing requirements of the external display device, generating four types of control signals required by the display device, i.e., frame synchronization signal VSYNC, line synchronization signal HSYNC, data enable signal DE and display clock signal PCLK; when the data enable signal DE is valid, continuously acquiring the image display data from the FIFO memory and then, sending the display data PDATA to the display device for display at the rising edge of each PCLK.

In an example, the specific functions and the cooperative processing procedures of the four types of control signals and the display data PDATA are described as follows:

TABLE 1

Mapping Relationship between Signals and Functions

| | |
|---|---|
| Frame synchronization signal VSYNC | Used as a marking signal for the first line |
| Data enable signal DE | Used as a power conversion signal for the display device as well as a signal for controlling pixel display |
| Line synchronization signal HSYNC | Used as an input data latch signal |
| Display clock signal PCLK | Used as a system clock signal or a dot clock signal |
| Display data PDATA | Used for providing image frame data |

At the start time of each image frame, the frame synchronization signal VSYNC outputs a positive pulse, indicating the start of a frame. N rows*M columns of pixels are scanned within the time of each frame. The line synchronization signal HSYNC is used to output N pulse signals at the start of each frame to cyclically activate the display of M columns of pixels in each row. The data enable signal DE provides an AC signal for the display pixels, which can be used to change the voltage polarity of N rows and M columns. It is often used as a switch signal for the pixels, and may also be used as a trigger signal for frame synchronization. Under the action of the frame synchronization signal VSYNC and the data enable signal DE, when the rising edge of each display clock signal PCLK comes, the display timing circuit sends Z bits of display data PDATA to the display device for image display. Suppose a pixel has Q bits.

$$Z=N \text{ rows}*M \text{ columns of pixels}*Q \qquad \text{Equation 1}$$

In an example, the display controller provided by the present invention performs the following display control method, comprising: the DMA controller is configured to provide acquired raw image data to the data processor; the data processor is configured to perform color conversion and image scaling processing on the acquired raw image data to generate an image layer, and provide the generated layer data to the image layer combiner; the image layer combiner is configured to perform layer combination and Gamma correction on the image layer data and then generate image data, and store the generated image data in the FIFO memory; the display timing circuit DTC is configured to access the FIFO memory to acquire the image data stored in the FIFO memory; the display timing circuit DTC receives a display trigger signal from the external display device and generates four types of control signals according to the image data stored in the FIFO memory, i.e., frame synchronization signal VSYNC, data enable signal DE, line synchronization signal HSYNC and display clock signal PCLK; the display timing circuit DTC converts the image data into display data PDATA according to the frame synchronization signal VSYNC and the line synchronization signal HSYNC; the display timing circuit DTC sends the display data PDATA to the external display device for image display, according to the data enable signal DE and the display clock signal PCLK;

Based on engineering experience, the data under run problem in the display device is categorized into two states in the present invention:

State 1: data under run during FIFO data reading by the timing controller TCON incurred by instantaneous insufficient system peak bandwidth. In the case, the duration of data under run is relatively short;

State 2: data under run incurred by a bandwidth trouble for a long time in the display system.

Therefore, the display timing circuit DTC in the display controller judges whether a data under run problem in the first state or the second state has occurred, through comparison between the data under run time length and a preset time length value. The display controller can execute corresponding processing steps according to the judgment result.

Figure 4:
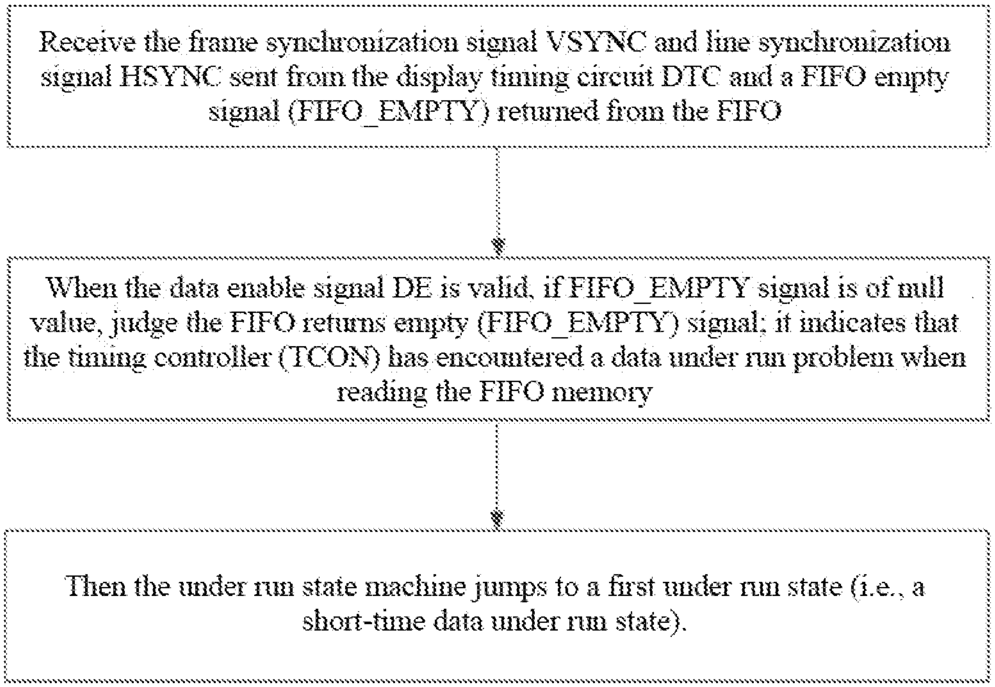
FIG. 4 shows a logic flow chart of the under run state machine for judging a short-time under run state according to an embodiment of the present invention.

In an example, as shown in FIG. 4, the under run state machine provided by the present invention use the following steps to determine a short-time under run state (state 1): receiving the frame synchronization signal VSYNC and the line synchronization signal HSYNC sent by the display timing circuit DTC and a FIFO empty signal FIFO_EMPTY returned by the FIFO; judging the FIFO empty signal FIFO_EMPTY returned by the FIFO when the data enable signal DE is valid; if the FIFO_EMPTY signal is valid, it indicates that the timing controller TCON has encountered a data under run problem when reading the first-in first out FIFO memory; then the under run state machine jumping to a first under run state (i.e., a short-time data under run state).

Figure 5:
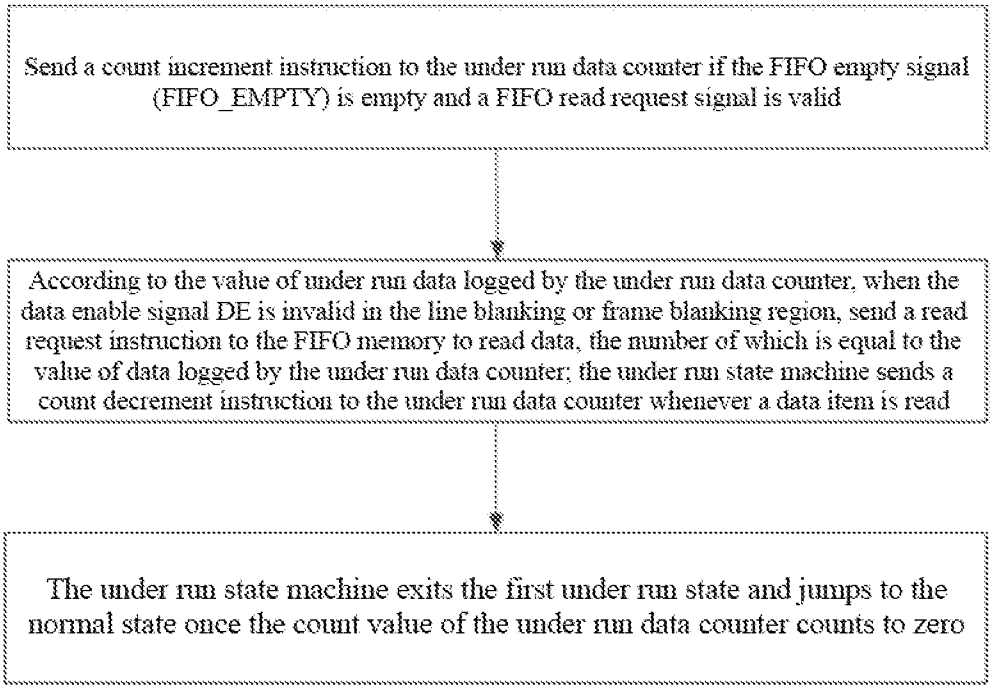
FIG. 5 shows a logic flow chart of the under run state machine for handling the short-time under run state according to an embodiment of the present invention.

In an example, as shown in FIG. 5, when the under run state machine is in the first under run state, the under run state machine is configured to execute the following steps: sending a count increment instruction ("counter +1") to the under run data counter if the FIFO_EMPTY signal is valid and the FIFO read request signal is valid; according to the value of under run data logged by the under run data counter (e.g., the value of under run data=X), when the data enable signal DE is invalid in the line blanking or frame blanking region, sending a FIFO read request instruction to the FIFO memory to read data, the number of which is equal to the value of data logged by the under run data counter (e.g., X corresponding data); the under run state machine sending a count decrement instruction ("counter −1") to the under run data counter whenever a data item is read; the under run state machine exiting the first under run state (short-time under run state) and jumping to the normal state once the under run data counter counts to zero.

Figure 6:
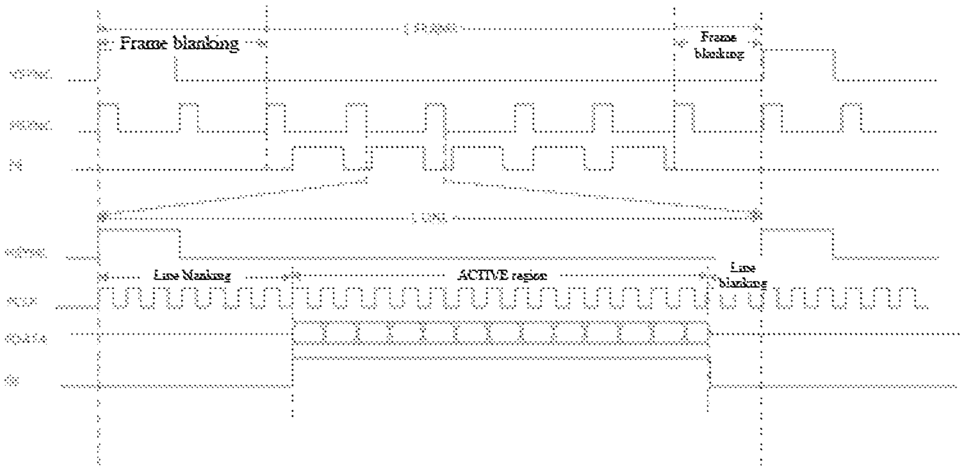
FIG. 6 shows a schematic diagram of the signal pulses for line blanking region and column blanking region during data under run according to an embodiment of the present invention.

In an example, as shown in FIG. 6, when the bandwidth problem occurs for a short time, an under run state machine for monitoring data under run and an under run data counter for data under run exist in the timing controller TCON. The under run data counter counts the number of data under runs (under run data of X pixels) in a valid display period (e.g., Z bits of data to be displayed) in real time. If null value (empty) occurs in the FIFO in the time period of the valid display region (the "ACTIVE region" in FIG. 6 represents the valid display region), the data count of the under run data counter is incremented by 1, and the under run state machine jumps to the first under run state at the same time. In the line blanking region (the region represented by "1LINE" in FIG. 6) or frame blanking region (the region represented by "1FRAME" in FIG. 6), the under run state machine drives to read X items of data logged by the under run data counter from the data FIFO, and the under run data counter is decremented by 1 whenever a data item is read, till the counter counts to zero, thereby ensuring that the display data of the next line or frame is correct. This method is suitable for the data under run when the timing controller TCON is reading FIFO, as is incurred by instantaneous insufficient system peak bandwidth.

The valid time period refers to a time period in which the DE is valid within the display time of one frame. When the data enable signal DE is valid, a FIFO read request signal is sent at the rising edge of each PCLK to read the display data from the data FIFO. If the FIFO read request is valid but the FIFO is empty, the under run data counter is incremented by 1. Here, the count value of the under run data counter is the number of the under run data. In that way, the counter can get the number of under run data items in the valid display region.

As an example, if null value (empty) occurs for the FIFO in the time period of the valid display region, the under run data counter is incremented by 1. The main module and process for judging whether "null value (empty) occurs for the FIFO" are as follows: the main module is the under run state machine, and it judges whether the FIFO has a null value at the rising edge of each PCLK as long as the FIFO read request signal is valid.

As an example, the main module and process for manipulating "under run data counter +I" are as follows: the main module is the under run data counter, and it increments the count value by 1 whenever it receives a pulse signal sent by the under run state machine for incrementing the under run data counter by 1.

As an example, if the FIFO read request is valid but the FIFO has a null value, the under run state machine jumps to the first under run state, and sends a pulse signal for incrementing the under run data counter by 1. "+1" means that the count value of the counter is incremented by 1 unit of quantity.

As an example, as shown in FIG. 6, when the under run state machine drives to read out X items of data logged by the under run data counter from the FIFO in the line blanking region (the region represented by "1LINE" in FIG. 6) or frame blanking region (the region represented by "1FRAME" in FIG. 6), in the region included by two adjacent frame synchronization signals VSYN, the region where the data enable signal DE is invalid is the blanking region; in the region included by two adjacent line synchronization signals HSYNC, the region where the data enable signal DE is invalid is the line blanking region, which is in unit of pixels.

As an example, the under run data counter is a multifunction data signal, and the under run state machine can directly call the data record of the under run data counter, so that the under run state machine can read out X items of data logged by the under run data counter from the FIFO.

As an example, with the same main module as the main module for "under run data counter +1" but with a reverse operating process, the under run data counter decrements by 1 whenever a data item is read, till the counter counts to zero.

As an example, when the timing controller TCON gets correct data from the FIFO, the display controller can ensure that the display data of the next line or frame is correct.

Figure 7:
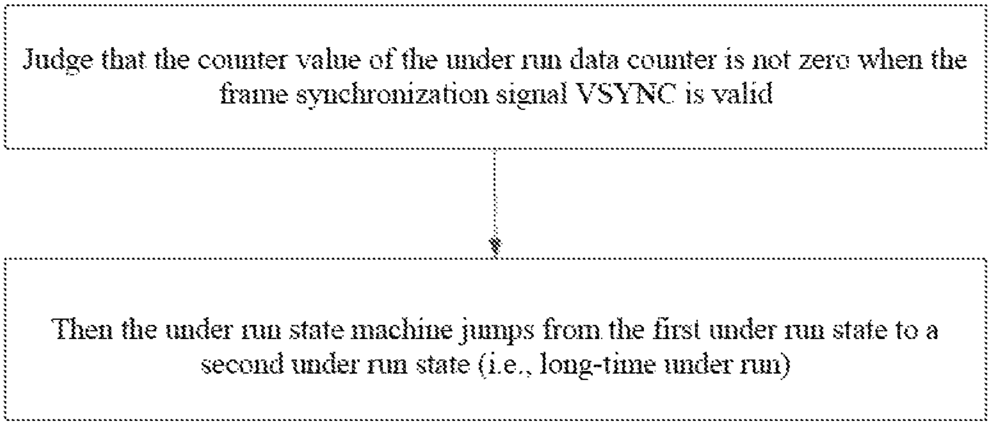
FIG. 7 shows a logic flow chart of the under run state machine for judging a long-time under run state according to an embodiment of the present invention.

As an example, as shown in FIG. 7, the under run state machine provided by the present invention use the following steps to judge a long-time under run state (state 2): determining that the count value of the under run data counter is not zero when the frame synchronization signal VSYNC is valid; then the under run state machine jumping from the first under run state to a second under run state (i.e., long-time under run).

Figure 8:
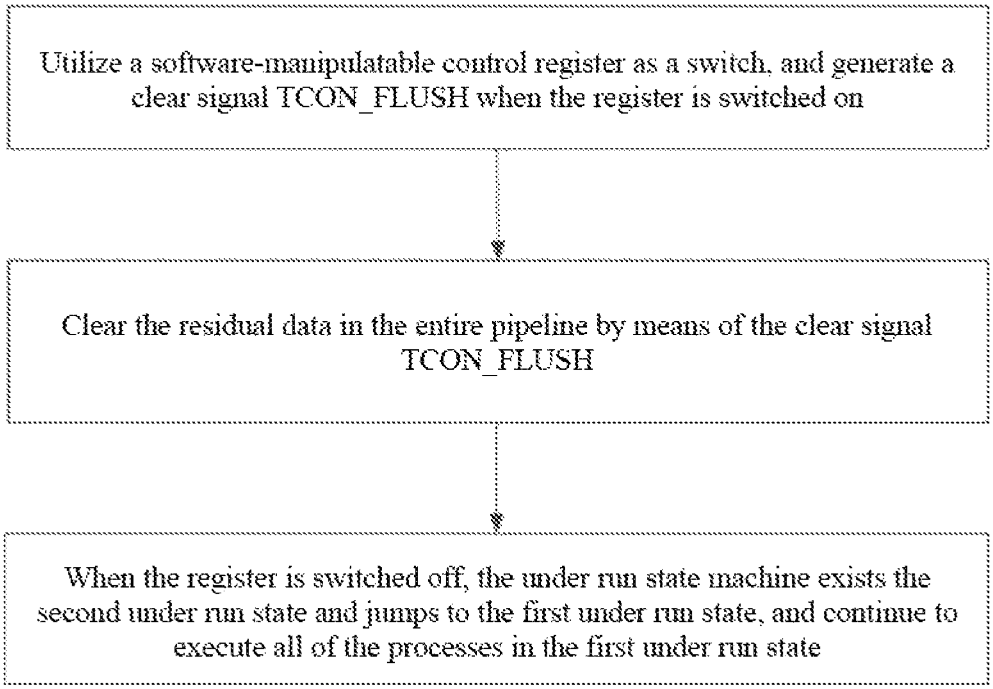
FIG. 8 shows a logic flow chart of the under run state machine for handling a long-time under run state according to an embodiment of the present invention.

As an example, as shown in FIG. 8, when the under run state machine is in the second under run state, the following steps are performed: using a software-programmable register as a switch, and generating a clear signal TCON_FLUSH when the register is switched on; clearing the residual data in the entire pipeline by means of the clearing signal TCON_FLUSH; when the register is switched off, the under run state machine exiting the second under run state and jumping to the first under run state, and continuing the execution of all processes in the first under run state. This method is more suitable for data under run incurred by a bandwidth trouble for a long time in the system. The under run state machine generates a tcon_flush signal, and clears the residual data in the entire pipeline at the rising edge of VSYNC by means of a control bit of a logic and software-programmable register.

The display controller and method thereof provided by the present invention utilize logic processing units, such as an under run state machine and an under run data counter, to effectively control the under run condition during the reading operation of a timing controller TCON, and ensure that the timing controller TCON can read correct display data from the FIFO at the start of display of the next frame by means of two different modes, thereby effectively solve the data under run problem that may lead to long-time blur on display screen, as is incurred by greater peak bandwidth consumption in the display system.

The design advantages of the display controller and method provided by the present invention include:

1. When the timing controller (TCON) encounters under run problem during reading FIFO, only the display of the current frame is affected, and the display will return to normal at the next frame.
2. The problem of data under run incurred by insufficient peak bandwidth of the system can be effectively solved, as is different from the existing preprocessing scheme, which can't realize a real-time self-recovery function when the data reading is not timely.
3. Low cost, only a few of logic control units need to be added.

The embodiments described above are only some preferred embodiments of the present invention. The letters in the brackets in the text part and the letters in the drawings are only symbols representing the names of the modules or steps, and their specific meanings should be comprehended on the basis of the description of the embodiments and the Chinese meanings. It should be noted that those skilled in the art can make various improvements and modifications without departing from the principle of the present invention, and those improvements and modifications should be deemed as falling into the scope of protection of the present invention.

The invention claimed is:

1. A display controller with data under run self-recovery function, characterized in that, it comprises:

an image processor and a timing controller (TCON), the image processor further comprises a direct memory access (DMA) controller, an image data processor, an image layer combiner, and a first-in-first-out (FIFO) memory;

the timing controller further comprises a display timing circuit (DTC), an under run state machine, and an under run data counter;

wherein the DMA controller is directly coupled to the image data processor, the image data processor is directly coupled to the image layer combiner, the image layer combiner is directly coupled to the FIFO memory, the DTC is directly coupled to the FIFO memory, the DTC is directly coupled to an external display device, and the under run state machine is directly coupled to each of the DTC, the under run data counter, the direct memory access DMA controller, the image data processor, the image layer combiner and the FIFO memory respectively, wherein the display timing circuit DTC is configured to execute the following steps:

access the FIFO memory to acquire the image data stored in the FIFO memory;

according to the timing requirements of the external display device, generate four types of control signals required by th display device, including a frame synchronization signal (VSYNC), a line synchronization signal (HSYNC), a data enable signal (DE) and a display clock signal (PCLK);

when the DE is valid, continuously acquire the image display data from the FIFO memory, and send display data (PDATA) to the display device for display at the rising edge of each PCLK, wherein the under run state machine is configured to execute the following steps:

receive the VSYNC and the HSYNC sent by the DTC and a null value signal (FIFO_EMPTY) returned by the FIFO memory, while the DE is valid, determine if the FIFO_EMPTY returned by the FIFO memory is valid; a valid FIFO_EMPTY being indicative that the timing controller TCON bas encountered a data under run problem when reading the FIFO memory;

then the under run state machine jumping first under run state, and wherein when the under run state machine is in the first under run state, the under run state machine is configured to execute the following steps:

send a count increment instruction to the under run data counter if the FIFO_EMPTY is valid and a FIFO read request signal is valid;

according to a value of under run data logged by the under run data counter when the DE is invalid in a line blanking or a frame blanking region, send a FIFO read request instruction to the FIFO memory to read data, the number of which is equal to the value of under run data; send a count decrement instruction from the under run statement to the under run data counter whenever a data item is read, the under run state machine exits the first under run state and moves to a normal state when the under run data counter is zero.

2. The display controller according to claim 1, characterized in that, the under run state machine is configured to execute the following steps:

determine whether the count value of the under run data counter is zero when the VSYNC is valid;

the under run state machine moves from the first under run state to a second under run state when the count value of the under run data counter is zero.

3. The display controller according to claim 2, characterized in that, when the under run state machine is in the second under run state, the under run state machine is configured to execute the following steps:

use a software-programmable register as a switch, and generate a clear signal (TCON_FLUSH) when the register is switched on;

clear the residual data in the entire pipeline by means of the TCON_FLUSH;

when the register is switched off, the under run state machine exits the second under run state and moves to the first under run state, and continues execution of all processes in the first under run state.

4. A display control method with data under run self-recovery function, characterized in that, said method comprises:

display control by an image processor and a timing controller (TCON), wherein the image processor further comprises a direct memory access (DMA); controller, an image data processor, an image layer combiner, and a first-in-first-out (FIFO, memory;

wherein DMA controller is directly coupled to the image data processor, the image data processor is directly coupled to the image layer combiner, the image layer combiner is directly coupled to the FIFO memory, the DTC is directly coupled to the FIFO memory, the DTC is directly coupled to an external display device, and the under run state machine is directly coupled to each of the DTC, the under run data counter, the direct memory access DMA controller, the image layer combiner and the FIFO memory respectively, the DTC is configured to perform the steps of:

accessing the FIFO memory, to acquire the image data stored in the FIFO memory;

the DTC receiving a display trigger signal from the external display device and generating four types of control signals according to the image data stored in the FIFO memory, including a frame synchronization signal VSYNC, a data enable signal (DE), a line synchronization signal (HSYNC) and a display clock signal (PCLK);

the DTC converting the image data into display data (PDATA), according to the VSYNC and the HSYNC;

when the DE is valid, the DTC sending the PDATA to the external display device for image display according to the PCLK;

the DTC sending the VSYNC and HSYNC and receiving an FIFO empty signal (FIFO_EMPTY) from the FIFO memory;

while the DE remains valid, determining by the DTC if the FIFO_EMPTY is valid to indicate that the TCON has encountered a data under run problem when reading the FIFO memory;

determining by the DTC that a data under run problem in the first state or the second sate has occurred through comparison between the data under run time length and a preset time length value;

the DTC carrying out corresponding under run processing according to the judgment result, wherein, the under run state machine executes the following steps when the DTC determines a first under run state;

the under run state machine sends a count increment instruction to the under run data counter if the FIFO_EMPTY is valid and a FIFO read request is valid, according to the value of the under run data logged by the under run data counter, when the DE is invalid in a line blanking or frame blanking region, the under run state machine sends a FIFO read request instruction to the FIFO memory to read data equal to the value of the under run data, the under run state machine sending a count decrement instruction to the under run data counter whenever a data item is read, the under state machine exiting the first run state and moving to a normal state when the under run counter is zero.

5. The display control method according to claim 1, characterized in that, the following steps are performed: determining whether the count value of the under run data counter is zero when the VSYNC is valid; the under run state machine moving from the first under run state to a second under run state once the count value of the under run data counter is zero.

6. The display control method according to claim 5, characterized in that, the under run state machine executes the following steps when it is in the second under run state:

using a software-programmable register as a switch, and generating a clear signal (TCON_FLUSH) when the register is switched on;

clearing the residual data in the entire pipeline by means of the clearing signal (TCON_FLUSH);

when the register is switched off, the under run state machine exiting the second under run state and moving to the first under run state, and continuing execution of all processes in the first under run state.

* * * * *